United States Patent
Horsley

(10) Patent No.: US 11,218,588 B2
(45) Date of Patent: Jan. 4, 2022

(54) METHODS AND APPARATUS FOR COMMUNICATING VIA DIGITAL SUBSCRIBER LINES

(71) Applicant: BRITISH TELECOMMUNICATIONS PUBLIC LIMITED COMPANY, London (GB)

(72) Inventor: Ian Horsley, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 17/269,745

(22) PCT Filed: Aug. 21, 2019

(86) PCT No.: PCT/EP2019/072354
§ 371 (c)(1),
(2) Date: Feb. 19, 2021

(87) PCT Pub. No.: WO2020/038989
PCT Pub. Date: Feb. 27, 2020

(65) Prior Publication Data
US 2021/0203772 A1    Jul. 1, 2021

(30) Foreign Application Priority Data
Aug. 21, 2019   (EP) ..................... 18190111

(51) Int. Cl.
*H04M 3/00*   (2006.01)
*H04M 11/06*  (2006.01)

(52) U.S. Cl.
CPC ......... *H04M 3/007* (2013.01); *H04M 11/062* (2013.01)

(58) Field of Classification Search
CPC ..... H04M 3/007; H04M 11/062; H04L 41/08; H04L 12/2878; H04L 12/2801; H04L 25/085; H04L 43/0847; H04B 3/32
(Continued)

(56) References Cited

U.S. PATENT DOCUMENTS 6,021,158 A * 2/2000 Schurr .................. H04L 1/0003
                                              375/211
8,351,582 B2 * 1/2013 Binder ................ H04L 12/2803
                                              379/93.08
(Continued)

FOREIGN PATENT DOCUMENTS

CN      103828253      5/2014
CN      106537796      3/2017
(Continued)

OTHER PUBLICATIONS

International Search Report for PCT/EP2019/072354 dated Oct. 4, 2019, 4 pages.
(Continued)

*Primary Examiner* — Maria El-Zoobi
(74) *Attorney, Agent, or Firm* — Nixon & Vanderhye P.C.

(57) ABSTRACT

Methods and apparatus are disclosed for communicating in a telecommunication system. In particular methods and apparatus are disclosed for establishing communications in a telecommunication system having an access node (16) and a plurality of Digital Subscriber Lines (DSLs) (21, 22, 23) each of which may be used to allow communication between the access node (16) and a respective Customer Premises Equipment (CPE) device (51, 52, 53), where communications on a plurality of lines (21, 21) are being performed using vectoring, and where it is desired to add one or more new lines (23) to the existing vectoring group.

20 Claims, 7 Drawing Sheets

(58) Field of Classification Search
USPC .......................................................... 375/220
See application file for complete search history.

(56) References Cited

U.S. PATENT DOCUMENTS

| | | | |
|---|---|---|---|
| 8,761,348 B2 | 6/2014 | Cioffi et al. | |
| 8,958,544 B2 | 2/2015 | Mermans | |
| 9,362,959 B2* | 6/2016 | Kuipers | H04B 3/32 |
| 10,033,421 B2* | 7/2018 | Pereira | H04B 1/30 |
| 2008/0205501 A1* | 8/2008 | Cioffi | H04M 3/2209 |
| | | | 375/224 |
| 2011/0286503 A1* | 11/2011 | Cioffi | H04M 11/062 |
| | | | 375/220 |
| 2013/0251141 A1* | 9/2013 | Mermans | H04B 3/32 |
| | | | 379/406.06 |
| 2015/0318875 A1* | 11/2015 | Kuipers | H04L 5/08 |
| | | | 370/297 |
| 2016/0080031 A1* | 3/2016 | Kassel | H04B 3/238 |
| | | | 379/406.06 |
| 2016/0233921 A1* | 8/2016 | Dogan | H04B 3/32 |
| 2016/0248476 A1* | 8/2016 | Coomans | H04B 3/487 |
| 2017/0006154 A1* | 1/2017 | Shridhar | H04Q 5/00 |
| 2018/0176387 A1* | 6/2018 | Kerpez | H04B 15/005 |

FOREIGN PATENT DOCUMENTS

| | | | |
|---|---|---|---|
| EP | 2 566 064 | 3/2013 | |
| EP | 2 852 067 | 3/2015 | |
| EP | 2 988 426 | 2/2016 | |
| EP | 2988426 A1 * | 2/2016 | .......... H04M 11/062 |
| WO | 2014/201662 | 12/2014 | |
| WO | 2016/139254 | 9/2016 | |
| WO | 2017/004550 | 1/2017 | |

OTHER PUBLICATIONS

Written Opinion of the ISA for PCT/EP2019/072354 dated Oct. 4, 2019, 6 pages.
International Preliminary Report on Patentability for PCT/EP2019/072354 dated Jul. 8, 2020, 12 pages.
Extended EP Search Report for EP18190111.7 dated Jan. 2, 2019, 8 pages.
GB Search Report for GB1813628.3 dated Feb. 11, 2019, 4 pages.
Office Action dated Jul. 16, 2021 issued in Chinese Application No. 201980067504.6 (9 pages).

* cited by examiner

Fig. 3(i): Before Addition of Third Line (DSL Line 3)

Fig. 3(ii): During Training of Third Line (DSL Line 3)

Fig. 3(iii): After Training and Addition of Third Line (DSL Line 3)

Fig. 4(i): Before Addition of Third Line (DSL Line 3)

Fig. 4(ii): During Training of Third Line (DSL Line 3)

Fig. 4(iii): After Training and Addition of Third Line (DSL Line 3)

Fig. 5(i): Before Addition of Third Line (DSL Line 3)

Fig. 5(ii): During Training of Third Line (DSL Line 3)

Fig. 5(iii): After Training and Addition of Third Line (DSL Line 3)

Fig. 6(i): Before Addition of Third Line (DSL Line 3)

Fig. 6(ii): During Training of Third Line (DSL Line 3)

Fig. 6(iii): After Training and Addition of Third Line (DSL Line 3)

METHODS AND APPARATUS FOR COMMUNICATING VIA DIGITAL SUBSCRIBER LINES

This application is the U.S. national phase of International Application No. PCT/EP2019/072354 filed Aug. 21, 2019 which designated the U.S. and claims priority to EP Patent Application No. 18190111.7 filed Aug. 21, 2018, the entire contents of each of which are hereby incorporated by reference.

TECHNICAL FIELD

The present invention relates to methods and apparatus for communicating in a telecommunication system, and in particular to methods and apparatus for establishing communications in a telecommunication system having an access node and a plurality of Digital Subscriber Lines (DSLs) each of which may be used to allow the transmission of data from a transmitter device to one or more receiver devices, the transmission of data involving transmission of data signals over metallic conductors such as pairs of wires. Such methods include all of the various Digital Subscriber Line (DSL) methods as specified in various International Telecommunications Union (ITU) standards and as being further developed in the ITU at present. Typically each such pair of wires comprises a twisted metallic pair (usually copper) as commonly found within telephone access networks throughout the world.

BACKGROUND

Digital Subscriber Line (DSL) technology takes advantage of the fact that although legacy twisted metallic pairs (which were originally installed merely to provide "Plain Old Telephone Services" (POTS) telephony connections) might only have been intended to carry signals using a differential mode at frequencies of up to a few Kilohertz, such lines can in fact often carry signals reliably at much greater frequencies. Moreover, the shorter the line, the greater the range of frequencies over which signals can reliably be transmitted (especially with the use of technologies such as Discrete Multi-Tone (DMT), etc.). Thus as access networks have evolved, telecommunications network providers have expanded their fibre-optic infrastructure outwards towards the edges of the access network, making the lengths of the final portion of each connection to an end-user subscriber (which is still typically provided by a metallic twisted pair) shorter and shorter, giving rise to correspondingly greater and greater bandwidth potential over the increasingly short twisted metallic pair connections without having to bear the expense of installing new optic-fibre connections to each subscriber. However, a problem with using high-frequency signals is that a phenomenon known as "cross-talk" can cause significant interference, reducing the effectiveness of lines to carry high bandwidth signals in situations where there is more than one metallic pair carrying similar high-frequency signals in close proximity to one another. In simple terms, the signals from one pair can "leak" onto a nearby line (which may be carrying similar signals) and appear as noise to the other line. Although cross-talk is a known problem even at relatively low frequencies, the magnitude of this effect tends to increase with frequency to the extent that at frequencies in excess of a few tens of Megahertz (depending on the length of the lines in question), the indirect coupling (e.g. from a near end of a second line to a remote end of a first line) can be as great as the direct coupling (e.g. from the near end of the first line to the remote end of the first line).

One well-known technique that can be used to prevent transmissions on one subscriber line from causing crosstalk or other interference on another subscriber line involves the use of spectral masks or "Power Spectral Density" (PSD) masks. Each line may have a spectral mask (i.e. governing power level versus frequency) assigned to protect other lines.

Also, in order to alleviate the problems caused by crosstalk (especially Far-End Cross-Talk or "FEXT" as it is known) a technology known as "vectoring" has been developed in which knowledge of the signals sent over crosstalking lines is used to reduce the effects of the cross-talk. In a typical situation a single DSL aggregation transceiver device such as a Digital Subscriber Line Access Multiplexor (DSLAM) acts as a co-generator of multiple downstream signals over multiple cross-talking lines and also as a co-receiver of multiple upstream signals from the same multiple cross-talking lines, with each of the lines terminating at a single Customer Premises Equipment (CPE) modem such that no common processing is possible at the CPE ends of the lines. In such a case, downstream signals may be pre-distorted to compensate for the expected effects of the cross-talking signals being sent over the neighbouring cross-talking lines such that on reception at the CPE devices the received signals are similar to what would have been received had no cross-talking signals been transmitted on the cross-talking lines. Correspondingly, upstream signals may be post-distorted (or detected in a manner equivalent to their having been post-distorted) after being received at the co-receiver (i.e. the DSLAM) in order to account for and minimise or cancel the effects of cross-talk which has leaked into the signals during their transmission.

Such pre-distortion of downstream signals to compensate for the expected effects of cross-talk is generally referred to as "pre-coding". This generally involves a Vectoring Control Engine or other such Vectoring Control Entity (VCE)—generally operating as a part of or as a module associated with the DSLAM or other such access node—multiplying the signals actually required/desired to be transmitted by a (generally square or "n by n", where "n" is the number of lines in a vectoring group) matrix of values (or otherwise transforming those signals) in order to obtain "pre-coded" signals that are then transmitted downstream (i.e. from the DSLAM or other such access node to a CPE modem or other such CPE).

Correspondingly, such post-distortion of upstream signals after their receipt at the co-receiver (i.e. the DSLAM or other such access node) in order to account for and minimise or cancel the effects of cross-talk which has leaked into the signals during their transmission is generally referred to as "post-coding". Correspondingly, this may involves the VCE multiplying the signals actually received using a matrix (generally the inverse of the corresponding "pre-coding matrix") of values (or otherwise transforming those signals) in order to obtain signals corresponding to those transmitted upstream (i.e. from a CPE modem or other CPE to the DSLAM or other such access node) prior to those signals having been affected by cross-talk.

Generally, vectoring is performed in respect of signals being transmitted in both the downstream and upstream directions, using corresponding "vectoring pre-coding" and "vectoring post-coding" matrices which may be calculated and updated (generally by or for the VCE) as set out below.

Vectored Training

Start-up (and restart) time is an increasing problem for DSL systems. This is largely linked to vectoring and the number of active lines already in a vectoring group when a new line joins, or when a number of new lines join. The delay can be up to a minute, or when groups of lines start up, a number of minutes. The more lines in the vector group, the longer the joining process generally takes.

The existing training process in relation to a set of vectored lines can be summarised as follows. The downstream crosstalk into existing lines is estimated, then the upstream crosstalk into existing lines is estimated. New lines can then communicate at a low rate. Finally, Far-End Crosstalk (FEXT) is estimated for all lines (which can also be referred to as "channels"). The time taken is related mainly to processing power in the DSLAM, and may also be influenced by the amount of additional noise in the process with more lines. This is because the process of estimation is generally not perfect. Each channel of crosstalk cancelled may be imperfect, leaving some residual noise.

The crosstalk channel estimation is generally carried out by sending probe sequences (orthogonal) on all lines at the same time and monitoring the received signals. Due to limited precision at all stages in the process and environmental noise on all lines, the more lines are included, the longer time the probe sequences will have to be transmitted in order to estimate the crosstalk coupling coefficients through the inherent noise in the system.

PRIOR DOCUMENTS

U.S. Pat. No. 8,761,348 (Cioffi et al) relates to a DSL training system for use in relation to VDSL2 and other systems with the aim of allowing them to be integrated into and used with a vectored DSLAM or other vectored or non-vectored DSL system without a new user disrupting service to other users in the same or a nearby binder. The system uses the existing transmit power, CARMASK (i.e. "Carrier Mask") and/or PSDMASK (i.e. "Power Spectral Density Mask") capabilities of current, pending and anticipated DSL standards including VDSL2 (or G.997.1 as modified for VDSL2) to reduce both downstream and upstream training signal levels so that training of a new DSL line is non-disruptive, despite a lack of knowledge of the pre-existing binder.

U.S. Pat. No. 8,958,544 (Mermans) relates to techniques for access nodes to provide broadband communication services to subscribers. In particular, it relates to a technique in which an access node has first and second transceiver units for initializing first and second communication channels over first and second communication lines. The initialization of the first and second communication channels includes first and second handshake phases wherein peer transceiver units exchange capabilities and select a common mode of operation, first and second crosstalk channel acquisition phases from the first and second communication lines, and first and second generic initialization phases. The access node also includes a line initialization controller configured to stretch the execution of the first handshake phase with respect to the execution of the second handshake phase so as to shorten a time difference between respective entries into the first and second crosstalk channel acquisition phases.

United States application US2016/080031 (Kassel) relates to a technique for initialization of a group of CPE devices during a training that in part registers capabilities of the CPEs, wherein at least one CPE registers late to the training and thus cannot be registered. In an example version, the method comprises: determining capabilities of the CPEs during a Joining Phase of the training, wherein it is determined whether a CPE device is capable of employing vectoring; then placing in a hold status the at least one CPE that registers late by keeping a line active that is coupled to the at least one CPE. Another Joining Phase is provided after the Joining Phase in order to register the at least one CPE which has registered late.

International application WO2016/139254 (BT) relates to methods and apparatus for transmitting data from a transmitter device to a plurality of receiver devices, and in particular to a method of transmitting data from a transmitter device to a first and a second receiver device, the receiver devices being connected to the transmitter device via a first and a second pair of wires respectively, each receiver device being operable to receive signals detected as a change over time in the potential difference across the local ends of each respective pair of wires extending between the receiver and the transmitter device, the transmitter device being operable to transmit signals onto the wires extending between the transmitter device and the receiver devices in order to transmit signals via the direct differential mode to each respective receiver, and is additionally operable to transmit signals to both receivers via a single common indirect channel, the method comprising: measuring the extent of coupling between the common indirect channel and each of the receiver devices, determining a plurality of weighting values in dependence upon the measured extent of the couplings, transmitting a first signal via the direct differential mode over the first pair and a second signal via the direct differential mode over the second pair and transmitting a combined signal onto the indirect channel, the combined signal comprising a weighted sum of the first and second signals, the weighting being done in accordance with the determined weighting values, and wherein each of the signals is pre-coded prior to being transmitted in order to pre-compensate for the expected effects of cross-talk from the other signals, and wherein the pre-coding of each signal, including the first and the second signal, is performed in dependence upon the determined weighting values.

European application EP2988426 (Huawei) relates to communications technologies, and in particular to a line initialization method, device and system. The method involves: when a new line is added, releasing at least one resource unit that is on a line at a Showtime stage, so that on the line at the Showtime stage data is transmitted on a remaining resource unit that is obtained after the at least one resource unit is released; performing basic initialization on the new line by using the at least one resource unit or a subset thereof, so that after the basic initialization, data can be transmitted on the new line by using the at least one resource unit or the subset thereof; and performing crosstalk cancellation initialization on the line at the Showtime stage and the new line by using all resource units, so that the new line is initialized to a line at the Showtime stage.

International application WO2017/00450 (Ikanos) relates to a technique for multi-operator vectoring in DSL modems. A first distribution point (DP) uses sets of modems to communicate with a second DP over a crosstalk link to exchange information and coordinate the use of multiple sets of frequency bands. The first DP may share a cable binder with the second DP and detect crosstalk on the subscriber lines in the cable binder. Based at least in part on the crosstalk detected by the first DP, the first and second DPs may communicate over a crosstalk link between sets of lines in the binder. The DPs may use one or more sets of predefined tones within the multiple sets of frequency bands to exchange messages, where the messages may include synchronization information, operating parameters, or control and data information.

European application EP2852067 (Alcatel Lucent) relates to devices and methods for pre- and post-compensation of cross-talk. In one embodiment, a central vectoring processor is disclosed coupled to Distributed Processing Units DPUs, and configured to process downstream communication signals to be transmitted over communication lines of a vectoring group connecting Customer Premises Equipment (CPEs) to the DPUs. The central vectoring processor is also configured to pre-compensate the communication signals for inter-DPU crosstalk occurring between communication lines connected to distinct DPUs, thereby obtaining partially pre-compensated communication signals to be transmitted to the respective DPUs for further pre-compensation of intra-DPU crosstalk occurring between communication lines connected to a same DPU.

SUMMARY OF THE INVENTION

According to a first aspect of the invention, there is provided a method in a Digital Subscriber Line, DSL, telecommunication system having an access node and a plurality of DSLs, wherein each DSL of the plurality of DSLs connects the access node to a Customer Premises Equipment, CPE, the method comprising the steps of:
the access node communicating, during a first time period, with a first Customer Premises Equipment, CPE, via a first DSL using a first frequency band and a first vectoring matrix;
the access node communicating, during the first time period, with a second CPE via a second DSL using a second frequency band and the first vectoring matrix;
selecting a third frequency band which uses a distinct set of frequencies to at least one of the first and second frequency bands; and
establishing communications between the access node and a third CPE via a third DSL by:
the access node transmitting training signals to the third CPE via the third DSL using the third frequency band;
calculating a second vectoring matrix for the third DSL based on the training signals, the second vectoring matrix differing from the first vectoring matrix; and
the access node communicating with the third CPE via the third DSL using the third frequency band and the second vectoring matrix.

The access node may be, incorporate or operate in association with a digital subscriber line access multiplexer (DSLAM) modem. Correspondingly, the respective CPEs may be, incorporate or operate in association with end-user DSL modems.

The step of selecting a third frequency band may involve identifying a third frequency band which uses a distinct set of frequencies to both the first and second frequency bands.

It will be appreciated that in some scenarios, the access node may be communicating, during the first time period, with one or more CPEs other than just the first and second CPEs, via more DSLs than just the first and second DSLs. In such scenarios, the third frequency band may be identified as a band or a sub-band which uses a distinct set of frequencies to one, some or all of the frequency bands used by the first, second and any other CPEs, while sharing some frequencies with one or more of those CPEs.

According to preferred embodiments, the first and second frequency bands may at least partly overlap.

According to preferred embodiments, the step of establishing communications between the access node and the third CPE may further include calculating, during a second, subsequent time period, a new vectoring matrix based on the access node communicating with the first CPE using the first frequency band, communicating with the second CPE using the second frequency band, and communicating with the third CPE using a fourth frequency band, the fourth frequency band being wider than the third frequency band; and
wherein the method further comprises the access node, during a third, subsequent, time period, communicating with the first CPE using the new vectoring matrix and the first frequency band, communicating with the second CPE using the new vectoring matrix and the second frequency band, and communicating with the third CPE using the new vectoring matrix and the fourth frequency band.

In such embodiments, the fourth frequency band may overlap at least partly with at least one of the first and second frequency bands.

Also in such embodiments, the third frequency band may be identified as a band outside the first and/or second frequency bands. Alternatively, the third frequency band may be identified as a sub-band within the first and/or second frequency bands. In such cases, the method may further include the step of calculating, during the first time period, a modified first vectoring matrix based on the access node communicating with the first CPE using the first frequency band without the third frequency sub-band and the access node communicating with the second CPE using the second frequency band without the third frequency sub-band;
and the step of establishing communications between the access node and the third CPE may occur during the second time period and may further include the substeps of:
the access node communicating with the first CPE using the modified first vectoring matrix and the first frequency band without the third frequency sub-band; and
the access node communicating with the second CPE using the modified first vectoring matrix and the second frequency band without the third frequency sub-band.

According to preferred embodiments, the third frequency band may be a frequency band identified within the first and/or second frequency bands, and may be arranged to use a distinct set of frequencies to those used by the first and/or second frequency bands by temporarily not using that set of frequencies by the first and/or second frequency bands.

According to preferred embodiments, the third frequency band may be identified as a band outside the first and/or second frequency bands.

According to preferred embodiments, the third frequency band may be identified as a band outside the first and second frequency bands and be reserved for use when establishing communications between the access node and the third and any subsequent CPE via the third and any subsequent DSL.

The vectoring matrices may comprise vectoring pre-coding matrices used to modify signals prior to those signals being included in communications between the access node and the respective CPEs via the respective DSLs.

Alternatively or additionally, the vectoring matrices comprise vectoring post-coding matrices used to modify signals after those signals have been included in communications between the respective CPEs and the access node via the respective DSLs.

According to preferred embodiments, the vectoring matrices may comprise both vectoring pre-coding matrices used to modify signals prior to those signals being included in communications from the access node to the respective CPEs via the respective DSLs, and vectoring post-coding matrices used to modify signals after those signals have been included in communications from the respective CPEs to the access node via the respective DSLs.

According to preferred embodiments, the communications between the access node and the CPEs may be performed using a DSL technology selected from G.mgfast, G.fast and VDSL2.

According to a second aspect of the invention, there is provided apparatus for use in a Digital Subscriber Line, DSL, telecommunication system having an access node and a plurality of DSLs, each DSL of the plurality of DSLs connecting the access node to a Customer Premises Equipment, CPE, the access node being configured to communicate, during a first time period, with a first Customer Premises Equipment, CPE, via a first DSL using a first frequency band and a first vectoring matrix, and being configured to communicate, during the first time period, with a second CPE via a second DSL using a second frequency band and the first vectoring matrix; the apparatus further being configured to:

select a third frequency band which uses a distinct set of frequencies to at least one of the first and second frequency bands; and establish communications between the access node and a third CPE via a third DSL by:

the access node transmitting training signals to the third CPE via the third DSL using the third frequency band, calculating a second vectoring matrix for the third DSL based on the training signals, the second vectoring matrix differing from the first vectoring matrix, and the access node communicating with the third CPE via the third DSL using the third frequency band and the second vectoring matrix.

According to a third aspect of the invention, there is provided a computer program element comprising computer program code to, when loaded into a computer system and executed thereon, cause the computer to perform the steps of a method as claimed in any o The various options and preferred embodiments referred to above in relation to the first aspect are also applicable in a corresponding manner in relation to the second and third aspects.

Preferred embodiments of the invention provide methods of initialising and/or training one or more new lines to be included in a vectored DSL system by (temporarily) moving existing lines from a sub-band of their frequency range (or alternatively reserving a sub-band of the available frequency range for the training of new lines) and performing initialisation/training of the new line or lines in this "quiet" (or at least "quieter") sub-band. Once initialised/trained, in methods according to preferred embodiments, the new line or lines and (where appropriate) the existing lines may expand their frequency ranges to use the full spectrum or greater parts thereof.

By temporarily restricting a new line to a distinct sub-band while removing (or having prevented communications involving) some or all of the other lines from this sub-band during an initial part of training of the new line, before subsequently allowing all lines to return to full band once initialisation/vectoring/training for the new line has been completed, preferred embodiments allow transmissions on the new line and the existing lines to be transmitted at or near full power even during the training phase for the new line while avoiding crosstalk from the existing lines affecting the initialisation/training of the new line unduly, and/or without affecting transmissions on the existing lines unduly.

Preferred embodiments of the invention can significantly reduce the amount of time taken to initialise and add one or more DSL lines into an existing group of vectored lines. This can be of benefit to end-user experience particularly when a connection is temporarily dropped and needs to be re-initialised, for example, and also has the potential to reduce costs for operators by reducing service interruptions experienced by end-users.

BRIEF DESCRIPTION OF THE DRAWINGS

A preferred embodiment of the present invention will now be described with reference to the appended drawings, in which.

DESCRIPTION OF PREFERRED EMBODIMENTS OF THE INVENTION

With reference to the accompanying figures, methods and apparatus according to preferred embodiments will be described.

Figure 1:
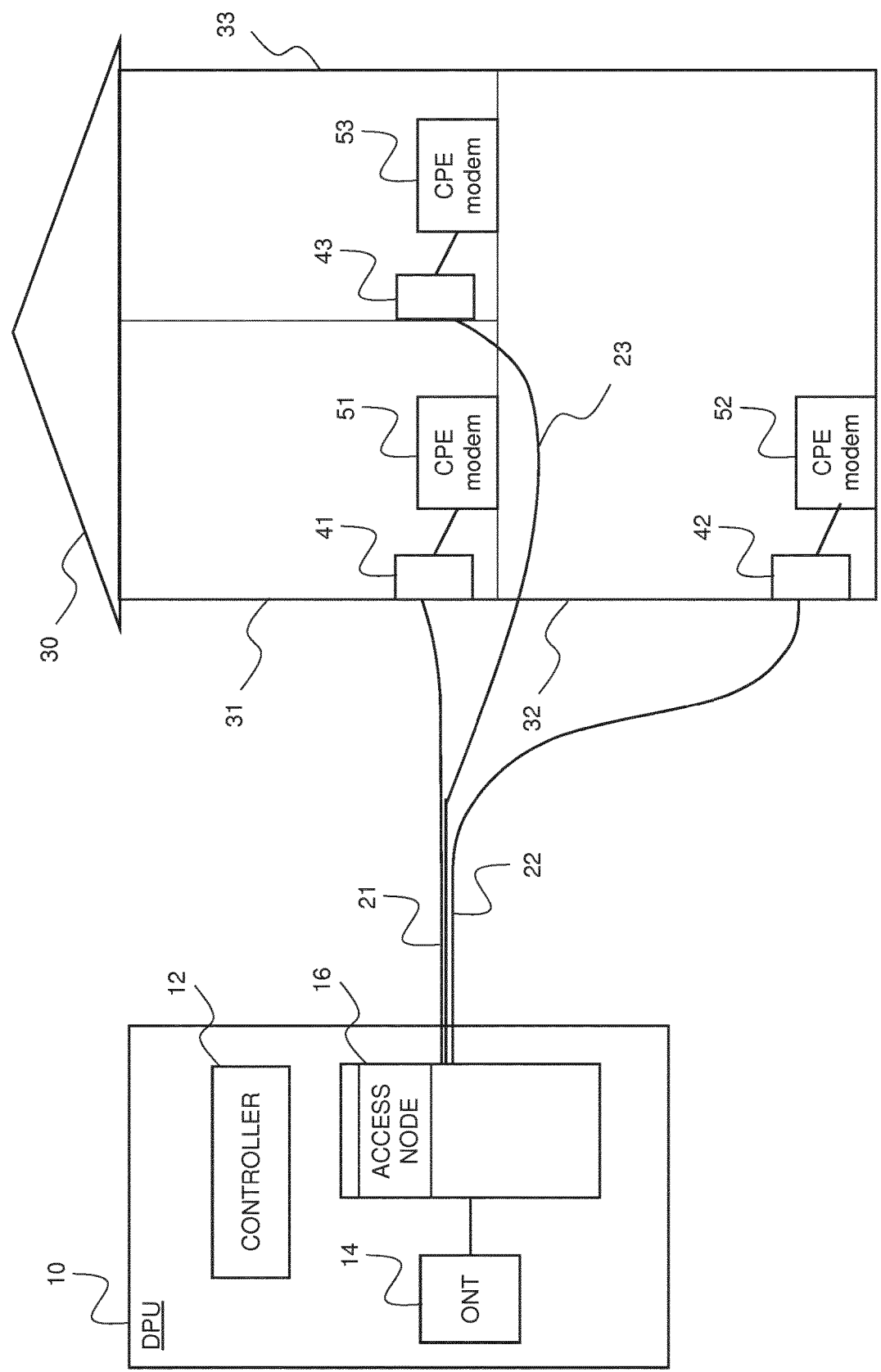
FIG. 1 is a schematic illustration of an example broadband connection deployment showing a Distribution Point Unit (DPU) and three customer premises having associated Customer Premises Equipment (CPE) modems connected to the DPU via respective Twisted Metallic Pair (TMP) connections.

Firstly, an example broadband deployment in which embodiments of the present invention could be employed will be illustrated in overview with reference to FIG. 1. As shown in FIG. 1, the example deployment comprises a Distribution Point Unit (DPU) 10 which is connected to three user premises 31, 32, 33 (which in this example are shown as rooms or flats within a single house 30) via respective Twisted Metallic Pair (TMP) connections 21, 22, 23 which connect between an Access Node (AN) 16 (e.g. a Digital Subscriber Line Access Multiplexor (DSLAM)) within the DPU 10 and respective Customer Premises Equipment (CPE) modems 51, 52, 53 via respective network termination points 41, 42, 43 within the respective customer premises 31, 32, 33. The DPU 10 additionally includes an Optical Network Termination (ONT) device 14 which provides a backhaul connection from the DPU 10 to a local exchange building (not shown) via an optical fibre connection such as a Passive Optic-fibre Network (PON) (also not shown), and a controller 12 which coordinates communications between the Access Node 16 and the ONT 14 and which may perform some management functions such as communicating with a remote Persistent Management Agent (PMA) (not shown).

It will be appreciated that while only three potentially cross-talking TMP connections are shown bundled together in FIG. 1, this is merely to simplify the figure and the discussion. In an actual deployment, there would generally be many more than three connections bundled together for at least a part of their paths between the DPU 10 and the respective CPE modems.

As will be apparent to a person skilled in the art, the illustrated deployment involving an optical fibre backhaul connection from a distribution point and a twisted metallic pair connection from the distribution point to the "customers" premises is the type of deployment for which standards such as the G.fast or the G.mgfast standards (discussed below) are intended to be applicable. In such a situation, the TMP connections may be short (e.g. a few hundred metres, or possibly as short as a few tens of metres) and because of this it is possible to use very high-frequency signals (e.g. up to a few hundred Megahertz) to communicate over the short TMPs because the attenuation of high-frequency signals is insufficient to prevent them from carrying useful information, due to the shortness of the lines. However, at such high frequencies, cross-talk can become a significant issue. This is especially likely to be the case where the cross-talking lines travel alongside each other for part of their extent (as in the situation illustrated in FIG. 1); however, cross-talk is still an issue at high frequencies (e.g. over 80 MHz) even where the lines only lie close to one another for a very small portion of their total extent (e.g. just when exiting the DPU 10).

G.fast is a DSL protocol standard for local loops shorter than 500 m, having performance targets between 100 Mbit/s and 1 Gbit/s, depending on loop length. The letter "G" in "G.fast" stands for the ITU-T G series of recommendations, and "fast" is an acronym for Fast Access to Subscriber Terminals. The G.fast standard proposes using vectoring techniques at all frequencies where there are cross-talking lines in order to mitigate against the effects of cross-talk.

Other related techniques to which embodiments of the invention may also be applicable include "XG-fast" and "G.mgfast". "XG-FAST" is the 5th generation broadband (5GBB) technology capable of delivering a 10 Gbit/s data rate over short copper pairs.

G.mgfast (which refers to "Multi-Gigabit FAST") is a recent ITU-T project intended to address functionality beyond G.fast, having objectives including: profiles beyond 212 MHz (424 MHz and 848 MHz); full-duplex operation (echo cancelled mode); aggregate data rates of 5 and 10 Gbit/s over single twisted pair and coaxial cable; and operation over low-quality twisted pair and quad, high quality twisted pair and coaxial cable.

Figure 2:
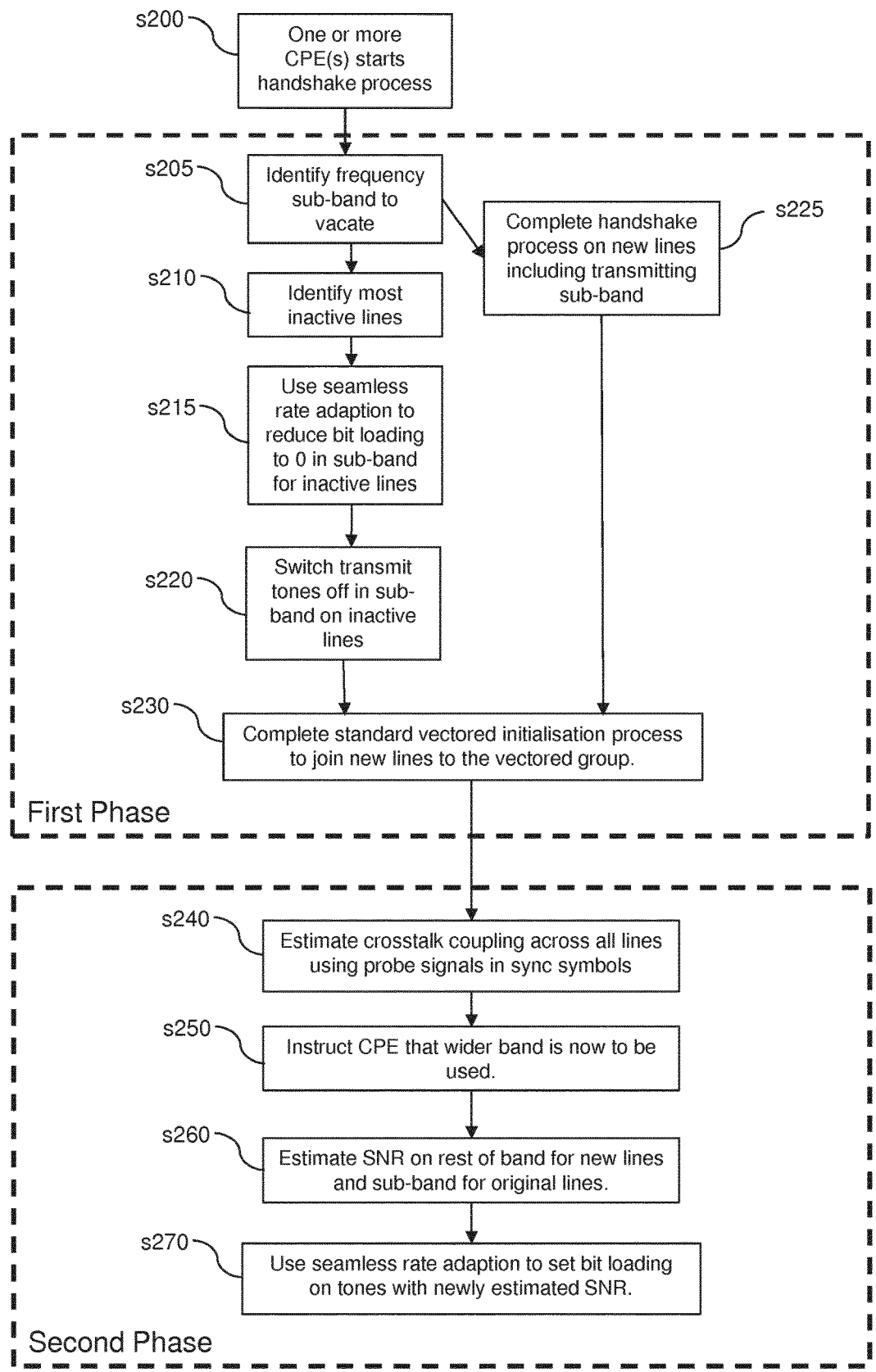
FIG. 2 shows a method of training up one or more additional DSL lines and adding it or them to an existing vectored group of lines according to a preferred embodiment.

A preferred embodiment will now be described in the context of a G.mgfast system, however it will be understood that embodiments of the invention are applicable in relation to any vectored DSL system. This will be described with reference to FIG. 2, which shows a method of training up one or more additional DSL lines and adding it or them to an existing vectored group of lines according to a preferred embodiment.

The described method involves a technique for joining into a sub-band and a technique for then moving to full bandwidth. However other techniques could be used for these steps. It will be described in relation to a scenario in which an Access Node 16 in the form of a DSLAM operating (i.e. communicating with CPE modems) in a range from 2 MHz to 424 MHz has 20 active lines, and has at least one new line which needs to be trained up.

First Phase

In a first phase, after a CPE initiates a handshake process (step s200) in respect of a new line that is suitable to be added to a group of lines in respect of which vectoring is being performed, a frequency band is selected (step s205). If the new line is known to be short, from previous training experiences this could be a band having higher frequencies (also referred to as "tones"), i.e. above those used by the longest existing, already-active loop. In the absence of such knowledge, a low frequency band may be selected, e.g. a range of 2 to 22 MHz.

A subset of lines to remove from the selected band is then chosen. During the subsequent process, these lines will temporarily lose ~200 Mb/s of capacity. This could be all of the existing lines (e.g. where there are only a few), or all but those in respect of which recent activity has been observed above a certain rate, all the short lines, or another such subset. In this example, the most inactive lines are identified (step s210). For simplicity, a situation where two existing lines are selected will be considered. The maximum number of lines left in the selected band could be operator-configurable, however, and priority markings could be included on some lines.

A Seamless Rate Adaption (SRA) procedure may then be used (as shown in step s215) to stop these lines loading any data on the selected tones. SRA is generally a receiver-initiated procedure (i.e. in this example, it would normally be controlled by the CPE in respect of downstream signals and by the DSLAM in respect of upstream signals), so a message may be required to be sent to the CPE to instruct it to vacate the sub band. The lines may be removed from these frequencies in an orderly manner, replacing the pre-coder on these frequencies with a sub-precoder. Existing techniques may be used for orderly leaving from a vector group. It can be achieved effectively by setting the transmit signal on these lines to zero (step s220). A message can be sent to inform the CPEs in question that these tones are not to be used for a set-period, or until further notice, to ensure that no signals are placed on these tones by the CPEs in question.

While steps s210 to s220 are being performed, the handshake process for the new line (or new lines, if the process is being performed in respect of more than one new line) may be completed (step s225). The handshake procedure is often performed in a different band to that used for the communication itself, so doesn't need to use the identified sub-band. For example the G.fast handshake can be performed below 1 MHz while the communication itself is above 2 MHz. Step s225 may thus include communicating the identified sub-band.

The training procedure for the new line is then started (step s230). The sub-band for training may be indicated to the CPE as an additional parameter along with existing parameters that define Power Spectral Density (PSD) limits and used tones. This could be implemented by using an additional parameter in the G.994.1 handshake phase.

The new line is then started up essentially using standard vectored DSL training procedures (as set out in G.9701 or G.993.5, for example) but limited to the signalled sub-band. The amount of computation is thus significantly reduced and shorter probe sequences could be used. This can therefore significantly reduce the time taken to join the new line to the vectored group.

The additional line can now be in "showtime", i.e. operating normally, and able to pass user traffic at a rate of up to 200 Mb/s. This rate is related to the size of the sub-band, which could be operator configurable.

Second Phase

Following the basic initialisation, the Vectoring Control Entity (VCE) continues to use sync symbols without traffic to estimate the downstream and upstream FEXT channels at all frequencies (step s240). Once this is complete the VCE can update the pre-coder such that signals between all lines can be transmitted at all frequencies.

An Embedded Operation Channel (EOC) or Robust Management Channel (RMC) message is then used to inform the CPE to extend the allowed bandwidth for the original lines back into the 2 to 22 MHz range and for the new lines into the range above 22 MHz (step s250).

Channel discovery signals are then used to estimate the signal-to-noise ratio (SNR) on the additional frequency band to be brought into use (step s260). These are typically low modulation order signals, such as those used in the O-P-MEDLEY signal in G.993.2. These don't need to be used to send SOC (Special Operations Channel) messages as normally used during initialisation, because the in show time management channels (RMC, EOC, etc.) have already be established and can be used to convey SNR estimates and run other procedures.

Once the SNR has been estimated on each tone an SRA procedure can be used to load bits on these tones and bring the lines into full use (step s270).

Referring now to FIGS. 3, 4, 5 and 6, these illustrate various possible scenarios in relation to which methods according to embodiments of the invention may be performed. In each of these figures, a scenario is considered in which at least one additional DSL line is to be initialised and trained, and added to an existing group of DSL lines which are already active and are already in a vectoring group. As indicated earlier, while these scenarios involve only one line being added to an existing vectored group of just two lines, these numbers of lines have been chosen purely to simplify the figures and the explanation—the number of lines being added may be greater than one, and the number of lines already in the vectored group may be significantly greater than two.

Each of these figures illustrates a scenario in which two lines in an existing vectoring group (Lines 1 and 2) are being used for communications between an access node (e.g. Access Node 16 in FIG. 1) and respective Customer Premises Equipment (CPE) entities (e.g. CPE modems 51 and 52 in FIG. 1), and in which a third line (Line 3) is to be added to the vectoring group and used for communications between the access node and a third CPE entities (e.g. CPE modem 53 in FIG. 1). Part (i) of each figure illustrates the respective frequency bands being used by Lines 1 and 2 before the addition of the third line (Line 3). Part (ii) of each figure illustrates the respective frequency bands being used by Lines 1, 2 and 3 during the training of the Line 3. Part (iii) of each figure illustrates the respective frequency bands being used by Lines 1, 2 and 3 after the training-up of Line 3 and its addition to the vectoring group.

Figure 3:
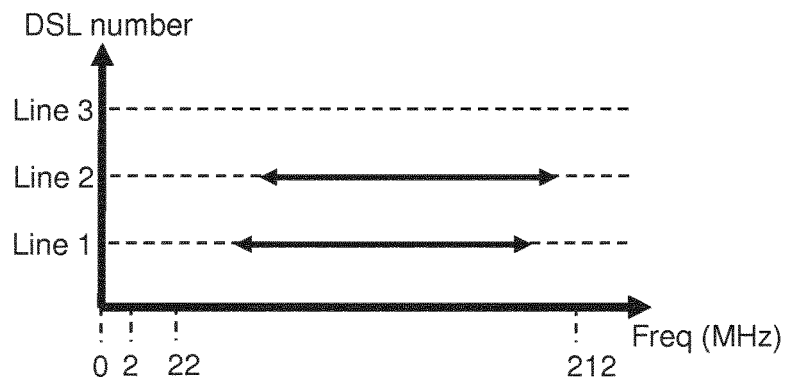
FIGS. 3, 4, 5 and 6 illustrate various possible scenarios in relation to which embodiments may be performed.
Figure 3:
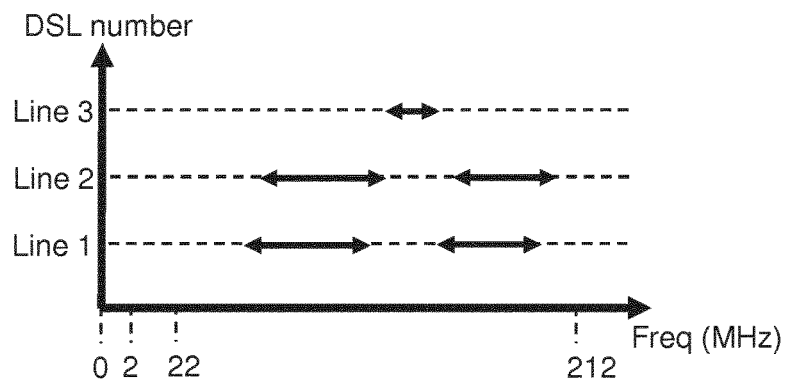
Figure 3:
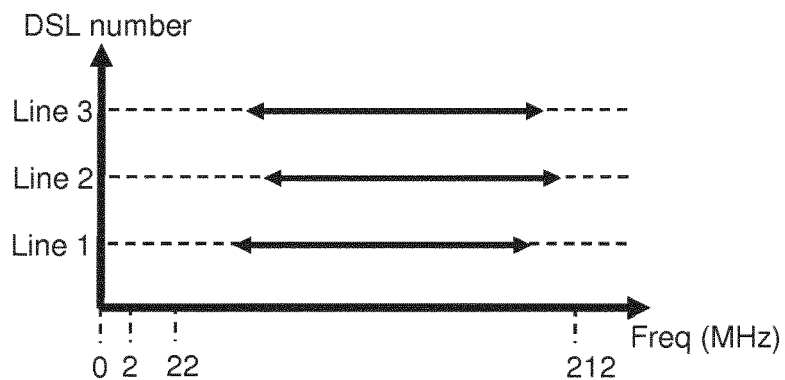

Referring first to FIG. 3, this illustrates a scenario in which—prior to the addition of Line 3—the two lines in the existing vectoring group (Lines 1 and 2) are communicating using respective frequency bands each having a range of frequencies across most (or possibly all) of the range from 22 MHz to 212 MHz, with the respective frequency bands corresponding or overlapping for much (or possibly all) of that range (see FIG. 3(*i*)). During the training up of Line 3, Lines 1 and 2 are instructed temporarily to vacate a small frequency band within each of their ranges, and that (temporarily "quiet") band is then used for the training up of Line 3 (see FIG. 3(*ii*)). Once the training up of Line 3 has been performed, Lines 1 and 2 return to using the full bands they were using before, and Line 3 expands its range of frequencies in order to use a full band corresponding or overlapping with much (or possibly all) of those ranges (see FIG. 3(*iii*)).

Figure 4:
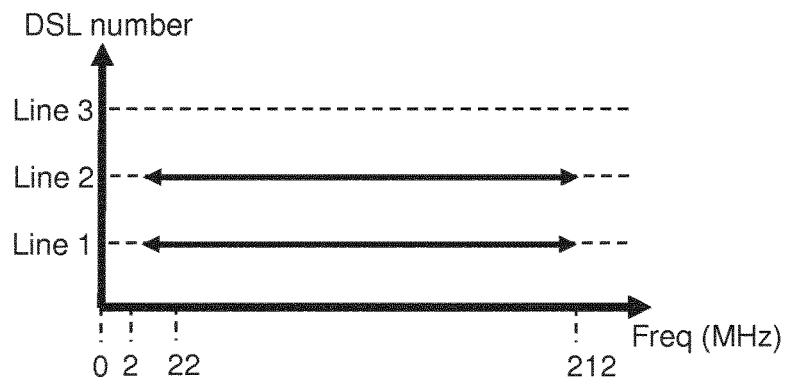
Figure 4:
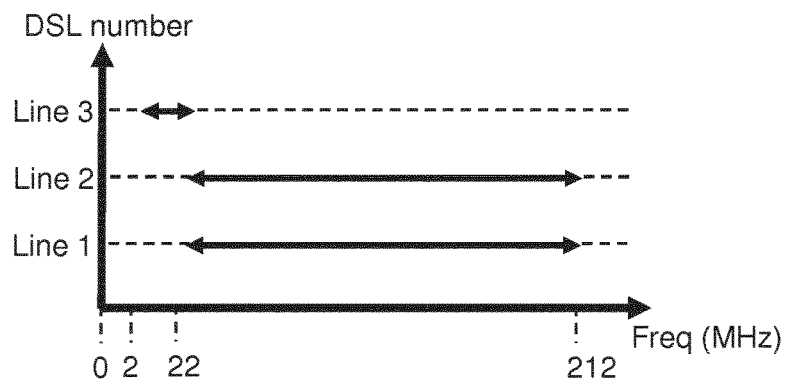
Figure 4:
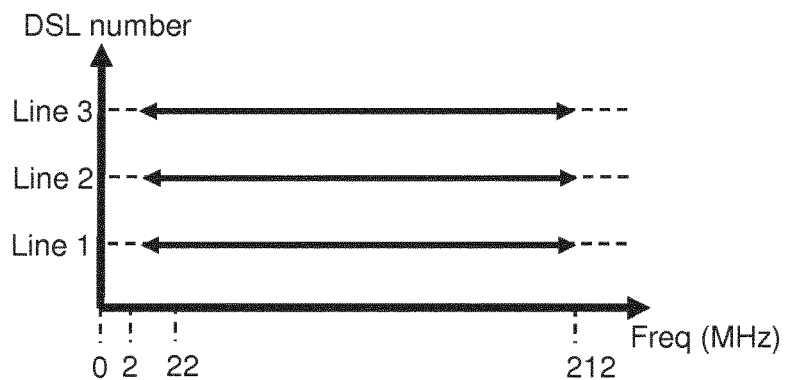

Referring next to FIG. 4, this illustrates a scenario in which—prior to the addition of Line 3—the two lines in the existing vectoring group (Lines 1 and 2) are communicating using respective frequency bands each having a range of frequencies across most (or possibly all) of the range from 2 MHz to 212 MHz, with the respective frequency bands corresponding or overlapping for much (or possibly all) of that range (see FIG. 4(*i*)). During the training up of Line 3, Lines 1 and 2 are instructed temporarily to vacate a small frequency band at the lower end of their ranges (e.g. 2 MHz to 22 MHz), and that (temporarily "quiet") band is then used for the training up of Line 3 (see FIG. 4(*ii*)). Once the training up of Line 3 has been performed, Lines 1 and 2 return to using the full bands they were using before, and Line 3 expands its range of frequencies in order to use a full band corresponding or overlapping with much (or possibly all) of those ranges (see FIG. 4(*iii*)).

Figure 5:
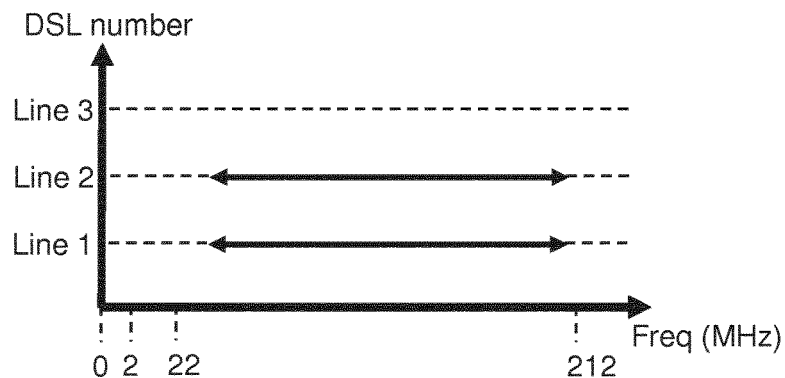
Figure 5:
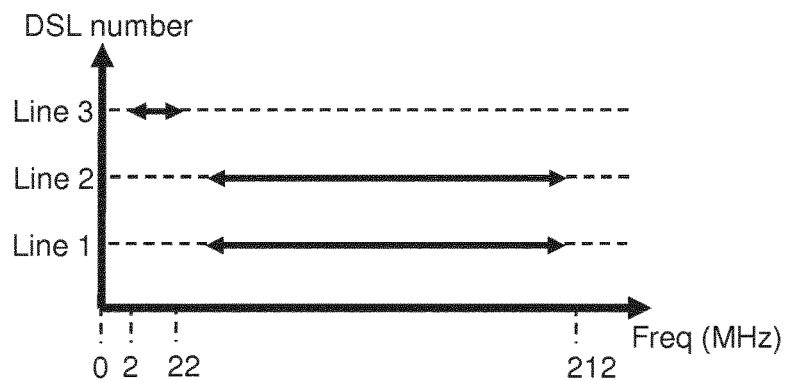
Figure 5:
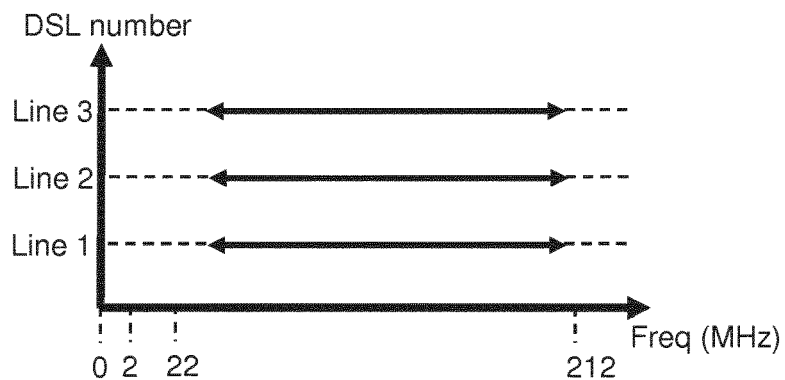

Thirdly, and with reference to FIG. 5, this illustrates a scenario in which—prior to the addition of Line 3—the two lines in the existing vectoring group (Lines 1 and 2) are communicating using respective frequency bands each having a range of frequencies across most (or possibly all) of the range from 22 MHz to 212 MHz, with the respective frequency bands corresponding or overlapping for much (or possibly all) of that range (see FIG. 5(*i*)), leaving a small frequency band at the lower end of their ranges (e.g. 2 MHz to 22 MHz) as a reserved "quiet" band (see FIG. 5(*i*)). This "quiet" band may thus be used by Line 3 for its training up (see FIG. 5(*ii*)) Once the training up of Line 3 has been performed, Line 3 vacates the reserved "quiet" band and expands its range of frequencies in order to use a full band corresponding or overlapping with much (or possibly all) of the ranges being used by Lines 1 and 2 (see FIG. 5(*iii*)).

Figure 6:
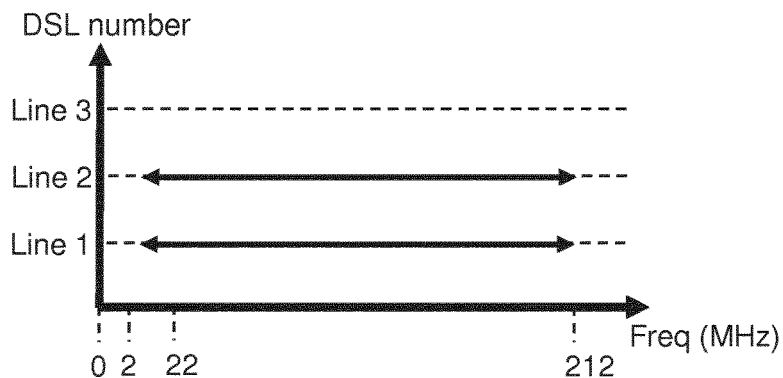
Figure 6:
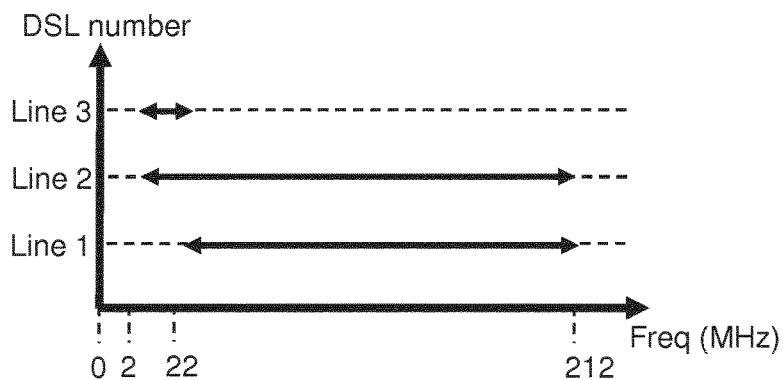
Figure 6:
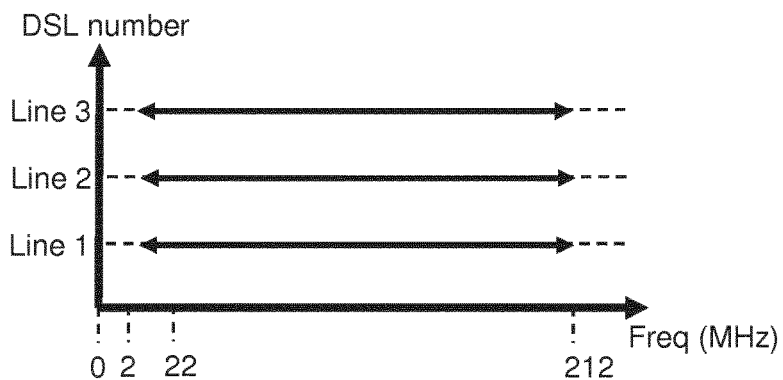

Fourthly, and with reference to FIG. 6, this illustrates a scenario in which—prior to the addition of Line 3—the two lines in the existing vectoring group (Lines 1 and 2) are communicating using respective frequency bands each having a range of frequencies across most (or possibly all) of the range from 2 MHz to 212 MHz, with the respective frequency bands corresponding or overlapping for much (or possibly all) of that range (see FIG. 6(*i*)). During the training up of Line 3, Lines 1 is instructed temporarily to vacate a small frequency band at the lower end of its range (e.g. 2 MHz to 22 MHz), and that (temporarily "quieter") band is then used for the training up of Line 3 (see FIG. 6(*ii*)). Once the training up of Line 3 has been performed, Line 1 returns to using the full band it was using before, and Line 3 expands its range of frequencies in order to use a full band corresponding or overlapping with much (or possibly all) of that range (see FIG. 6(*iii*)).

As indicated previously, while the above scenarios show only one line being added to an existing vectored group of just two lines, these numbers of lines have been chosen purely to simplify the figures and the explanation—the number of lines being added may be greater than one, and the number of lines already in the vectored group may be significantly greater than two. The scenario illustrated with reference to FIG. 6 is intended to show that it may not be necessary for the third frequency band (i.e. the range of frequencies to be used for communications on Line 3 during the training thereof) to use a distinct set of frequencies to the first and second frequency bands in order for the third frequency band to be completely "quiet" due to having no overlap with either of the frequency bands being used at that time for communications on Lines 1 and 2. Instead, a third frequency band may be identified that is distinct from at least one of the frequency bands being used for communications on Lines 1 and 2 (or some but not all of the existing lines, where there are more than two) while still being allowed to overlap with one (or more) of them, resulting in the third frequency band being "quieter" (rather than completely quiet) due to having no overlap with one of the frequency bands being used at that time for communications on Lines 1 and 2 (or where there are more than two existing lines in the vectoring, the third frequency band may be identified such that there is no overlap with the band or bands that would otherwise have been in use for at least some of the existing lines). The logic for selecting which line or lines to remove would generally be could be operator-configurable and may be similar to that discussed earlier in relation to step s210 of FIG. 2. The line or subset of lines to remove from the selected band may be chosen such as to leave on their full bands one or more lines that are or have recently been relatively inactive, as these are less likely to cause crosstalk in the selected band, while removing those that are or have recently been relatively active, as these are more likely to cause crosstalk in the selected band, for example.

Various other options relating to how methods according to the invention may be performed will now be briefly discussed.

If multiple lines are attempting to join (or are desired to be added to an existing vectoring group) at the same time, they may be grouped together in order to use the same distinct "quiet" (or at least "quieter") sub-band for training up, or they may be assigned different sub-bands. The former may result in a limited amount of cross-talk occurring between the new lines during their training up, but would limit the amount of the available frequency range that would need to be vacated by existing lines or reserved for the training up of new lines. Conversely, the latter may increase the amount of the available frequency range that would need to be vacated by existing lines or reserved for the training up of new lines, while minimising or avoiding cross-talk between the new lines during their training up period.

If all lines are due to start or re-start at the same time (due to a power cycle, for example), the lines in question could grouped together and assigned sub-bands such that they can all start quickly and at the same time.

The bands to use and/or lines to remove from a particular band can be pre-chosen, potentially allowing a reduced pre-coder matrix to be computed and used.

In the first phase, all lines could be removed from the sub-frequency band in question, potentially meaning that no vectoring pre-coder estimate would be required for the line to start-up to a basic rate.

Figure 7:
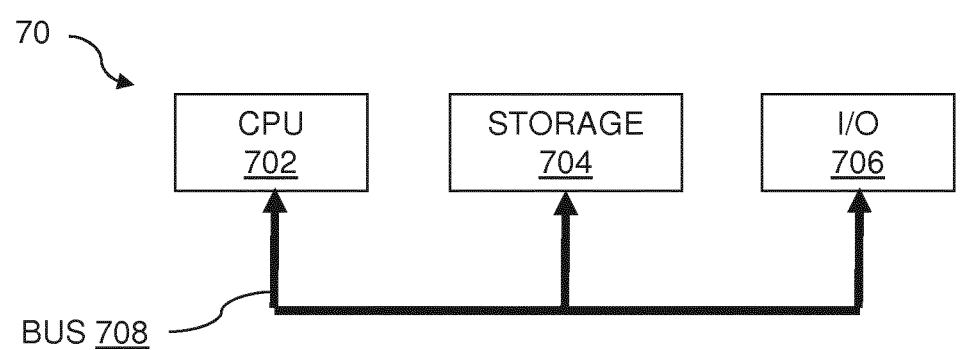
FIG. 7 is a block diagram of a computer system suitable for the operation of embodiments of the present invention.

FIG. 7 is a block diagram of a computer system 70 suitable for the operation of embodiments of the present invention. A central processor unit (CPU) 702 is communicatively connected to a data store 704 and an input/output (I/O) interface 706 via a data bus 708. The data store 704 can be any read/write storage device or combination of devices such as a random access memory (RAM) or a non-volatile storage device, and can be used for storing executable and/or non-executable data. Examples of non-volatile storage devices include disk or tape storage devices. The I/O interface 706 is an interface to devices for the input or output of data, or for both input and output of data. Examples of I/O devices connectable to I/O interface 706 include a keyboard, a mouse, a display (such as a monitor) and a network connection. Such a computer system may form a part of an access node such as Access Node 16 in FIG. 1, or be a module configured to operate in association with such an access node, for example.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the invention may include other novel features or combinations of features disclosed herein. The applicant hereby gives notice that new claims may be formulated to such features or combinations of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method in a Digital Subscriber Line, DSL, telecommunication system having an access node and a plurality of DSLs, wherein each DSL of the plurality of DSLs connects the access node to a Customer Premises Equipment, CPE, the method comprising the steps of:
the access node communicating, during a first time period, with a first Customer Premises Equipment, CPE, via a first DSL using a first frequency band and a first vectoring matrix;
the access node communicating, during the first time period, with a second CPE via a second DSL using a second frequency band and the first vectoring matrix;
selecting a third frequency band which uses a distinct set of frequencies to at least one of the first and second frequency bands; and
establishing communications between the access node and a third CPE via a third DSL by:
the access node transmitting training signals to the third CPE via the third DSL using the third frequency band;
calculating a second vectoring matrix for the third DSL based on the training signals, the second vectoring matrix differing from the first vectoring matrix; and the access node communicating with the third CPE via the third DSL using the third frequency band and the second vectoring matrix.

2. A method as claimed in claim 1 wherein the first and second frequency bands at least partly overlap.

3. A method as claimed in claim 1, wherein the step of establishing communications between the access node and the third CPE further includes calculating, during a second, subsequent time period, a new vectoring matrix based on the access node communicating with the first CPE using the first frequency band, communicating with the second CPE using the second frequency band, and communicating with the third CPE using a fourth frequency band, the fourth frequency band being wider than the third frequency band; and
wherein the method further comprises the access node, during a third, subsequent, time period, communicating with the first CPE using the new vectoring matrix and the first frequency band, communicating with the second CPE using the new vectoring matrix and the second frequency band, and communicating with the third CPE using the new vectoring matrix and the fourth frequency band.

4. A method as claimed in claim 3 wherein the fourth frequency band overlaps at least partly with at least one of the first and second frequency bands.

5. A method as claimed in claim 3, wherein the third frequency band is selected as a sub-band within the first and/or second frequency bands;
wherein the method further includes the step of calculating, during the first time period, a modified first vectoring matrix based on the access node communicating with the first CPE using the first frequency band without the third frequency sub-band and the access node communicating with the second CPE using the second frequency band without the third frequency sub-band;
and wherein the step of establishing communications between the access node and the third CPE occurs during the second time period and further includes the sub-steps of:
the access node communicating with the first CPE using the modified first vectoring matrix and the first frequency band without the third frequency sub-band; and
the access node communicating with the second CPE using the modified first vectoring matrix and the second frequency band without the third frequency sub-band.

6. A method as claimed in claim 1 wherein the third frequency band is a frequency band selected within the first and/or second frequency bands, and is arranged to use a distinct set of frequencies to those used by the first and/or second frequency bands by temporarily not using that set of frequencies by the first and/or second frequency bands.

7. A method as claimed in claim 1, wherein the third frequency band is selected as a band outside the first and/or second frequency bands.

8. A method as claimed in claim 1 wherein the third frequency band is a frequency band selected outside the first and second frequency bands and is reserved for use when establishing communications between the access node and the third and any subsequent CPE via the third and any subsequent DSL.

9. A method as claimed in claim 1 wherein the vectoring matrices comprise vectoring pre-coding matrices used to modify signals prior to those signals being included in communications between the access node and the respective CPEs via the respective DSLs.

10. A method as claimed in claim 1 wherein the vectoring matrices comprise vectoring post-coding matrices used to modify signals after those signals have been included in communications between the respective CPEs and the access node via the respective DSLs.

11. A method as claimed in claim 1 wherein the communications between the access node and the CPEs are performed using a DSL technology selected from G.mgfast, G.fast and VDSL2.

12. Apparatus for use in a Digital Subscriber Line, DSL, telecommunication system having an access node and a plurality of DSLs, each DSL of the plurality of DSLs connecting the access node to a Customer Premises Equipment, CPE, the access node being configured to communicate, during a first time period, with a first Customer Premises Equipment, CPE, via a first DSL using a first frequency band and a first vectoring matrix, and being configured to communicate, during the first time period, with a second CPE via a second DSL using a second frequency band and the first vectoring matrix; the apparatus further being configured to:
select a third frequency band which uses a distinct set of frequencies to at least one of the first and second frequency bands; and
establish communications between the access node and a third CPE via a third DSL by:
the access node transmitting training signals to the third CPE via the third DSL using the third frequency band,
calculating a second vectoring matrix for the third DSL based on the training signals, the second vectoring matrix differing from the first vectoring matrix, and
the access node communicating with the third CPE via the third DSL using the third frequency band and the second vectoring matrix.

13. A non-transitory computer-readable storage medium storing computer program code to, when loaded into a computer system and executed thereon, cause the computer to perform the steps of a method as claimed in claim 1.

14. The apparatus of claim 12, wherein the first and second frequency bands at least partly overlap.

15. The apparatus of claim 12, wherein the apparatus is further configured to:
calculate, during a second, subsequent time period, a new vectoring matrix based on the access node communicating with the first CPE using the first frequency band, communicate with the second CPE using the second frequency band, and communicate with the third CPE using a fourth frequency band, the fourth frequency band being wider than the third frequency band such that:
the access node, during a third, subsequent, time period, communicates with the first CPE using the new vectoring matrix and the first frequency band, communicates with the second CPE using the new vectoring matrix and the second frequency band, and communicates with the third CPE using the new vectoring matrix and the fourth frequency band.

16. The apparatus of claim 15, wherein the fourth frequency band overlaps at least partly with at least one of the first and second frequency bands.

17. The apparatus of claim 15, wherein:
the third frequency band is selected as a sub-band within the first and/or second frequency bands;
the apparatus is further configured to calculate, during the first time period, a modified first vectoring matrix based on the access node communicating with the first CPE using the first frequency band without the third frequency sub-band and the access node communicating with the second CPE using the second frequency band without the third frequency sub-band; and communications are established between the access node and the third CPE occurs during the second time period and include:

the access node communicating with the first CPE using the modified first vectoring matrix and the first frequency band without the third frequency sub-band; and the access node communicating with the second CPE using the modified first vectoring matrix and the second frequency band without the third frequency sub-band.

18. The apparatus of claim 12, wherein the third frequency band is a frequency band selected within the first and/or second frequency bands, and is arranged to use a distinct set of frequencies to those used by the first and/or second frequency bands by temporarily not using that set of frequencies by the first and/or second frequency bands.

19. The apparatus of claim 12, wherein the third frequency band is selected as a band outside the first and/or second frequency bands.

20. The apparatus of claim 12, wherein the third frequency band is a frequency band selected outside the first and second frequency bands and is reserved for use when establishing communications between the access node and the third and any subsequent CPE via the third and any subsequent DSL.

* * * * *